Dec. 22, 1959  F. MUSZYNSKI  2,917,857
DUCK DECOY
Filed May 13, 1957  2 Sheets-Sheet 1
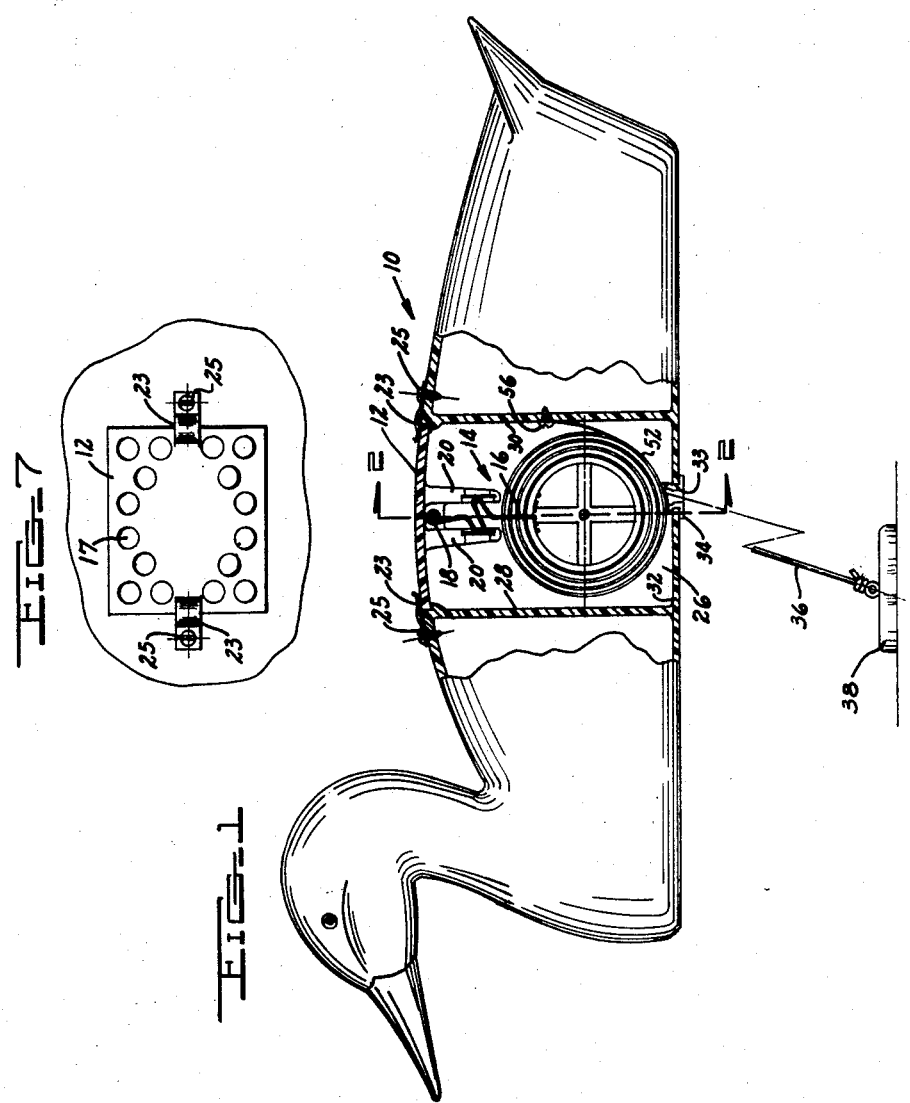
INVENTOR
Francis Muszynski
BY
KOTTS & SHERIDAN
ATTORNEYS Dec. 22, 1959 F. MUSZYNSKI 2,917,857
DUCK DECOY
Filed May 13, 1957 2 Sheets-Sheet 2
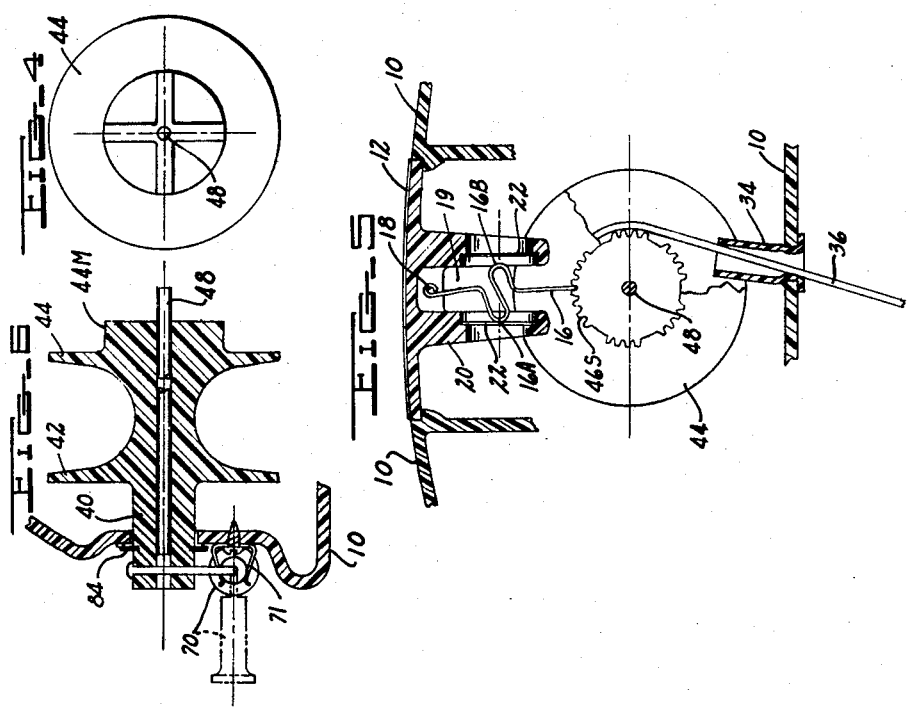
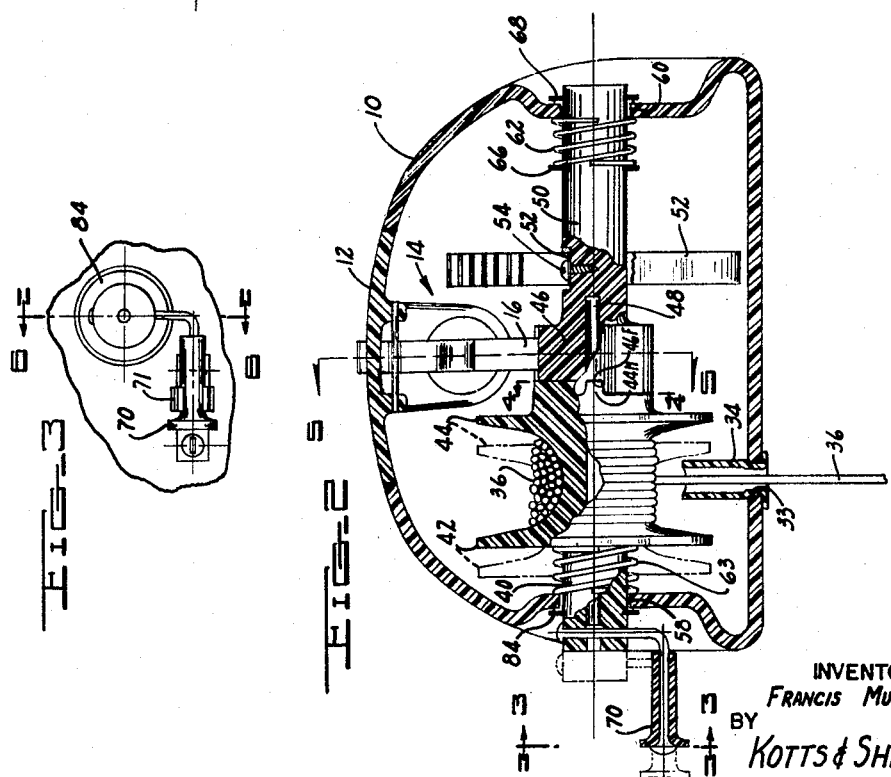
INVENTOR
FRANCIS MUSZYNSKI
BY
KOTTS & SHERIDAN
ATTORNEYS

United States Patent Office 2,917,857
Patented Dec. 22, 1959

2,917,857

DUCK DECOY

Francis Muszynski, Taylor Center, Mich.

Application May 13, 1957, Serial No. 658,546

4 Claims. (Cl. 43—3)

The present invention relates to new and useful improvements in decoys, and more particularly to a compartmented decoy construction which will not drift when anchored. Further, the decoy of the present invention will quack automatically when placed in uncalm water as a result of wave motion which is imparted to the anchored decoy.

While a floating decoy is not a new device, the present invention provides a new approach to an old problem. The problem is the free movement and use of the hands while hunting, unhampered by the necessity of holding and operating the conventional duck call. With the present invention, the hunter may take aim and shoot at will, since the decoy of the present invention operates automatically and renders the hunters hands free at all times.

Conventional decoys are placed in the water by the hunter near a duck blind and merely float quietly on the surface of the water. The duck hunter then works with his hands and mouth to imitate a duck call. The present invention when installed in a decoy not only floats realistically on the moving surface of the water, but also quacks automatically. This novel construction allows the hunter to observe the area surrounding him at all times, and permits him complete freedom of body movement.

It is an object of the present invention to provide an automatic quacking decoy, which is realistic in size and shape, wherein a quacking mechanism is installed therein which operates automatically when said decoy is anchored in moving water.

Another object of the present invention is the provision of a decoy which is equipped with a springloaded anchor line, which decoy will operate and remain fixed under spring tension when anchored in moving water.

Still another object of the present invention is the provision of an automatic quacking decoy which has a disengageable clutch mechanism in connection with an anchor line storage reel. Free rotational movement of the anchor line storage reel with the clutch mechanism disengaged, permits the anchor line length to be adjusted for any water depth. It also prevents any possibility of overwinding the spring-loaded anchor line storage reel, which would render the automatic quacking mechanism inoperative.

Still another object of the present invention is the provision of a decoy which when used in multiplicity provides the realistic sound and action of a large covey of ducks.

It has been found that the foregoing and related objects can be accomplished by the provision of an automatic quacking decoy, comprising a body housing, said body housing acting as a sounding box; an anchor line reel shaft rotatably mounted to said body housing; an anchor line storage reel secured to said reel shaft, one end of an anchor line being affixed to said reel, and the other end being affixed to an anchor member; at torsion spring having one end affixed to said anchor line reel shaft, the other end being secured to the decoy housing; a disengageable clutch mechanism between said anchor line storage reel and said torsion spring to permit adjustment of the anchor line length for various depths of water, and prevent an overwinding of said torsion spring, said disengageable clutch mechanism having serrations on the outer diameter which engage a flexible reed member affixed to said housing; rotation of said clutch mechanism causing a quacking sound when the decoy is anchored in moving water and the tension on said anchor line is increased or decreased.

Other objects of this invention will appear in the following description and appended claims, reference being had to the accompanying drawings forming a part of this specification wherein like references characters designate corresponding parts in the several views.

In the drawings:

Fig. 1 is a cross-sectional view of an automatic quacking decoy, embodying the present invention.

Fig. 2 is a cross-sectional view taken on line 2—2 of Fig. 1.

Fig. 3 is an elevational view taken in the direction of arrows 3—3 of Fig. 2, showing the adjustable spring tensioning bell crank and lock device.

Fig. 4 is an end view of the clutch mechanism taken on line 4—4 of Fig. 2.

Fig. 5 is a sectional view taken substantially along line 5—5 of Fig. 2.

Fig. 6 is a sectional view taken along line 6—6 of Fig. 3.

Fig. 7 is a partial top plan view of the decoy top section with the silk cover removed.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings, Fig. 1 represents a floating automatic quacking decoy assembly 10 embodying the present invention.

The decoy assembly 10, embodying the present invention, has mounted therein a quacking assembly 14 which is affixed to a cover member 12. A vibrating member 16 is pivotally secured to the cover 12 by a pivot pin 18. An echo box compartment 19 having side members 20 has mounted therein echo box sounders 22, which are struck by the curved portions 16a and 16b of the vibrating member 16. The quacking assembly 14 is affixed within the decoy 10 by means of leaf spring members 23 which engage the top cover member 12 and is secured by screws 25.

A sounding box 26 is formed by the vertical wall members 28 and 30 extending from the bottom structure 32 of the decoy assembly 10. An opening 33 fitted with a tube grommet member 34 permits movement of the anchor line 36 therethrough and has affixed thereto an anchor member 38. The tube grommet 34 is of such length as to extend above the waterline of the decoy and renders the sounding box compartment dry at all times. The opposite end of the anchor line 36 is affixed to a reel shaft 40 which has molded thereon flange members 42 and 44. Reel flange member 44 has a protruding extension 44M thereon forming a coupling structure to engage a similar female depression 46F in a third serrated coupling flange member 46.

An axle rod pilot shaft 48 extends through the central portion of the reel shaft 40 and pilots into the coupling flange member 46. A shaft 50 extends from the third serrated clutch flange 46 (Fig. 2) and has mounted thereon, one end of a torsion spring 52 which is secured by screw 54. The other end of the torsion spring 52 is secured to the forward housing wall 30 in the sounding box compartment by screw 56.

The reel shaft 40 is rotatably mounted in a sleeve bearing member 58 in the left side wall of the decoy housing 10. The shaft 50 journalled in sleeve bearing member 60, is mounted in the right side wall of the decoy housing 10. Engagement of the coupling flange members 44 and 46 is maintained by coil spring 62, acting between the right side wall of the decoy housing 10 and is positioned by a snap ring 66 affixed to the shaft 50. A similar snap ring 68 is positioned outside the decoy housing 10 to limit sidewise movement of the shaft 50. The left end of the reel shaft 40 is held into engagement with the coupling flange 46 by means of a similar coil spring 63 acting against the left side wall of the housing and the reel flange member 42. A snap ring 84 positioned outside the left side wall of the decoy housing limits the endwise movement of this shaft. This prevents the entire assembly from becoming off-centered.

A reel crank handle 70 is affixed to the reel shaft member 40. Endwise movement of the reel crank handle to the left permits disengagement of the clutch flanges 44 and 46 and permits rotation of the anchor line reel for proper depth adjustment of the anchor member 38 when the decoy is set out. When the decoy is not in use the handle may be locked in position by vertical rotational engagement of the handle 70 into the spring clip member 71.

Endwise movement of the reel crank member 70 to the left, causes the coupling flange members 44 and 46 to become disengaged, thus permitting free movement of the anchor line 36. Engagement of the coupling member then causes the movement of the anchor line 36 to be limited by the rotation of the torsion spring 52. Consequently when the torsion spring 52 is properly adjusted the anchorline 36 will be allowed to move about the reel and the decoy will quack automatically while floating realistically in moving water. Movement of the water in which the decoy is anchored causes the anchor line 36 to lengthen and shorten. As the motion of the water reacts against the anchored decoy, the torsion spring 52 causes the vibrating member 16 to be operated within the serrations 46S in the serrated clutch flange member 46, which in turn causes sound to be emitted in the echo box and sounding box. Rotation of the serrated flange member 46 actuates the vibrating member 16 causing the radial portions 16a and 16b to strike the sounder members 22 and echo within the sounding box compartment 26. The sounds created within the sounding box compartment 26 and echo box will emanate through openings 17 in the top cover. The openings 17 are covered with suitably colored silk, treated with airplane dope to provide maximum sound transmission (not shown).

From the foregoing description, it will be readily apparent to those skilled in the art that the automatic quacking decoy herein described is simple in operation, permits the hunter using the device increased freedom of motion with his hands, and eliminates the necessity of constantly retrieving a decoy which has floated away. Further a hunter may anchor several automatic quacking decoys which would simulate the sounds of a covey of ducks, whereas a hunter using a duck call can imitate only a single duck at any given time.

Having thus described my invention I claim:

1. An automatic quacking decoy assembly comprising a hollow body housing, forming a sounding box; a two part, disengageable coupling shaft mounted in said housing; said coupling shaft having an enlarged serrated hub portion; a storage reel secured to said shaft for rotation therewith; an anchorline, one end of which is affixed to said reel, the other end secured to an anchor member; said coupling shaft being spring loaded; a cover on said hollow body housing assembly; and a flexible vibrating member on said cover and in engagement with said serrated hub, rotation of said hub and reel causing a quacking sound when said decoy is placed in moving water and the tension on said anchorline is increased or decreased.

2. An automatic quacking decoy comprising a hollow body housing assembly forming a sounding box; a disengageable, two part coupling shaft mounted in said housing assembly; said coupling shaft having a serrated hub portion; a storage reel secured to said shaft for rotation therewith; an anchorline; one end of said anchorline affixed to said storage reel, the other end to an anchor member; a torsion spring, one end secured to said coupling shaft, the other end to said housing assembly; a cover on said hollow body housing assembly; a flexible vibrating member on said cover and in engagement with said serrated hub, rotation of said hub and reel causing a quacking sound when said decoy is placed in moving water; and a crank secured to said coupling shaft for engaging said two parts, said crank providing a means to wind or unwind said anchor line.

3. An automatic quacking decoy comprising a hollow body housing forming a sounding box; a disengageable, two part coupling shaft mounted in said housing assembly; said coupling shaft having a serrated hub portion; a storage reel secured to said shaft for rotation therewith; an anchorline; one end of said anchorline affixed to said storage reel, the other end to an anchor member; an axle rod for positioning and aligning the two part coupling shaft; a torsion spring, one end secured to said coupling shaft the other end to said housing assembly; a cover on said hollow body assembly; a flexible vibrating member on said cover and in engagement with said serrated coupling shaft hub, rotation of said hub and reel causing a quacking sound when said decoy is placed in moving water and the tension on said anchorline is increased or decreased; and a crank member for disengaging said two part coupling to permit adjustment of tension and length of said anchorline.

4. A compartmented automatic decoy comprising a hollow body housing forming a sounding box; a disengageable, two part coupling shaft mounted in said housing assembly; said coupling shaft having a serrated hub portion; a torsion spring, one end secured to said coupling shaft, the other end to said housing assembly; a flexible vibrating member in engagement with said serrated hub and mounted in an echo box assembly integral with a top cover member; said top cover being affixed to said body housing assembly; rotation of said hub and reel causing a quacking sound when the decoy is placed in moving water and the tension on said anchorline is increased or decreased.

References Cited in the file of this patent

UNITED STATES PATENTS

| | | |
|---|---|---|
| 827,972 | Grignon | Aug. 7, 1906 |
| 1,021,910 | Baker et al. | Apr. 2, 1912 |
| 1,789,649 | Gazecki et al. | Jan. 20, 1931 |